(12) United States Patent
Osman et al.

(10) Patent No.: US 11,871,263 B2
(45) Date of Patent: Jan. 9, 2024

(54) SYSTEM AND METHOD FOR 5G MOBILE NETWORK MANAGEMENT

(71) Applicant: Sandvine Corporation, Waterloo (CA)

(72) Inventors: Alexander Osman, Waterloo (CA); Kamakshi Sridhar, Plano, TX (US); Ty Sayers, Waterloo (CA); Jorge Quan, Waterloo (CA); Rajani Nesargikar, Bangalore (IN); Gangaraju K Siddalingaiah, Bengaluru (IN)

(*) Notice: Subject to any disclaimer, the term of this patent is extended or adjusted under 35 U.S.C. 154(b) by 11 days.

(21) Appl. No.: 17/549,053

(22) Filed: Dec. 13, 2021

(65) Prior Publication Data

US 2022/0191731 A1   Jun. 16, 2022

Related U.S. Application Data

(60) Provisional application No. 63/125,140, filed on Dec. 14, 2020.

(30) Foreign Application Priority Data

Dec. 13, 2021 (EP) .................................... 21214175

(51) Int. Cl.
*H04W 28/02* (2009.01)
*H04L 67/00* (2022.01)
(Continued)

(52) U.S. Cl.
CPC ....... *H04W 28/0268* (2013.01); *H04L 41/147* (2013.01); *H04L 47/76* (2013.01); *H04L 67/34* (2013.01)

(58) Field of Classification Search
None
See application file for complete search history.

(56) References Cited

U.S. PATENT DOCUMENTS 10,581,664 B1 * 3/2020 Peng .................. H04W 4/24
10,601,932 B2   3/2020 Kodaypak et al.
(Continued)

FOREIGN PATENT DOCUMENTS

WO        2017140356 A1     8/2017

OTHER PUBLICATIONS

Rossem et. al. Profile-Based Resource Allocation for Virtualized Network Functions. IEEE Transactions On Network and Service Management, vol. 16, No. 4, Dec. 2019. (Year: 2019).*

(Continued)

*Primary Examiner* — Andre Tacdiran
(74) *Attorney, Agent, or Firm* — Amarok IP Inc.; Neil W. Henderson

(57) ABSTRACT

A method and system for network management on a 5G network. The method including: building a subscriber persona associated with a subscriber on the network; predicting a traffic load on a network function based on the subscriber's persona; and allocating the subscriber to a network function based on the traffic load and the subscriber's persona. The system including: a subscriber persona builder configured to build a subscriber persona associated with a subscriber on the network; an analysis module configured to predict a traffic load on a network function based on the subscriber's persona; and an allocation module configured to allocate the subscriber to a network function based on the traffic load and the subscriber's persona.

14 Claims, 6 Drawing Sheets

(51) Int. Cl.
*H04L 41/147* (2022.01)
*H04L 47/76* (2022.01)

(56) References Cited

U.S. PATENT DOCUMENTS

| | | | |
|---|---|---|---|
| 2014/0195927 A1 | 7/2014 | DeWeese et al. | |
| 2015/0056960 A1* | 2/2015 | Egner | H04W 4/027 |
| | | | 455/411 |
| 2017/0041242 A1* | 2/2017 | Isobe | H04L 47/29 |
| 2017/0126476 A1* | 5/2017 | Curtin | H04L 41/5009 |
| 2017/0346760 A1* | 11/2017 | Kelly | H04L 47/805 |
| 2019/0098544 A1* | 3/2019 | Han | H04W 36/30 |
| 2019/0174498 A1 | 6/2019 | Samdanis et al. | |
| 2020/0274777 A1* | 8/2020 | Liu | H04L 43/20 |
| 2021/0120452 A1* | 4/2021 | Kotecha | H04W 48/18 |
| 2021/0219179 A1* | 7/2021 | Narath | H04W 76/10 |

OTHER PUBLICATIONS

Extended European Search Report, European Patent Office, corresponding EP Patent Application No. 21214175.8, dated Apr. 19, 2022.

\* cited by examiner

| Tput | Loss | RTT |
|---|---|---|
| 0-1 | | |
| 1-2 | Video persona | |
| 2-3 | | |
| 3-4 | | |
| 4-5 | | |

Table 2

| Tput | Loss | RTT |
|---|---|---|
| 0-1 | | |
| 1-2 | Gamer persona | |
| 2-3 | | |
| 3-4 | | |
| 4-5 | | |

Table 3

| Tput | Loss | RTT |
|---|---|---|
| 0-1 | | |
| 1-2 | Talker persona | |
| 2-3 | | |
| 3-4 | | |
| 4-5 | | |

Table 4

Fig. 4

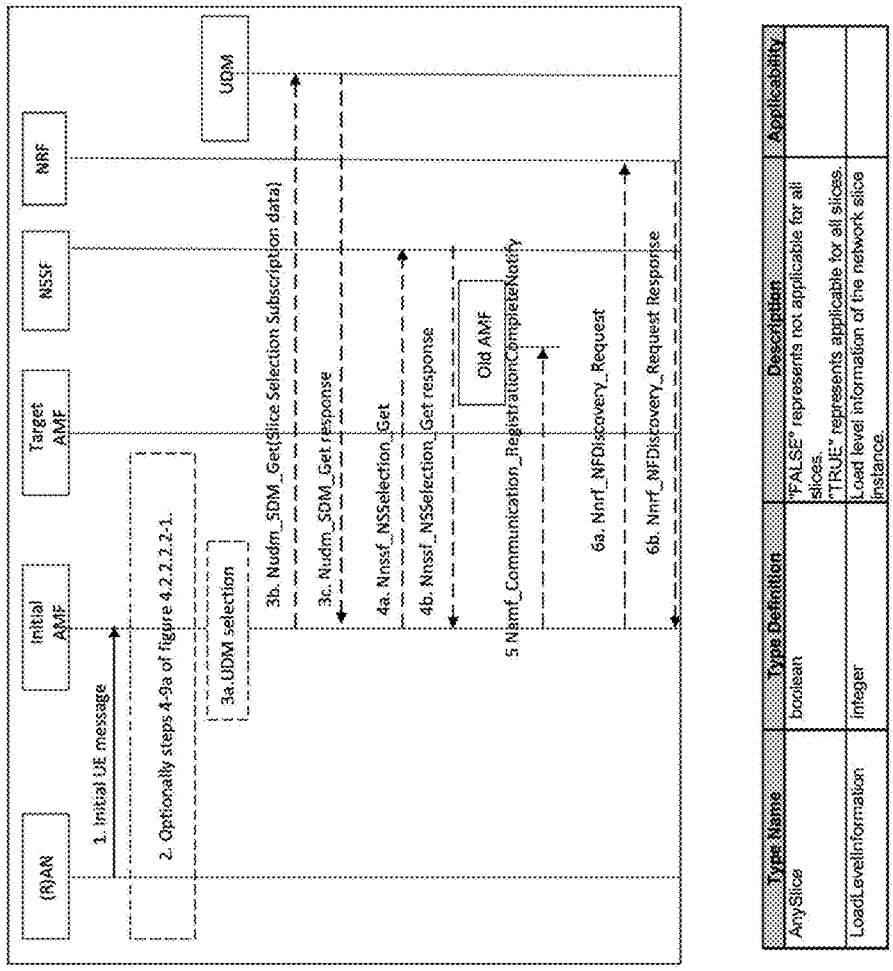

SYSTEM AND METHOD FOR 5G MOBILE NETWORK MANAGEMENT

RELATED APPLICATIONS

The present disclosure claims priority to U.S. Provisional Patent Application No. 63/125,140 filed Dec. 14, 2020 which is hereby incorporated in its entirety by reference.

FIELD

The present disclosure relates generally to mobile computer networks. More particularly, the present disclosure relates to a system and method for subscriber aware and/or intent based and/or application aware network management on a 5G computer network.

BACKGROUND

Network traffic continues to increase all over the world. Network operators continue to upgrade and improve their networks in order to continue to meet demand. As network operators move to newer network equipment the operators are beginning to incorporate more 5G networks in an aim to meet customer demand.

With the integration of 5G networks, network operators still need to continue to monitor network characteristics such as Quality of Service (QoS), Quality of Experience (QoE) and the like, for their subscribers. Generally speaking, network operators continue to look for ways to ensure that the network is providing the appropriate service to the subscribers. In some cases, where network operators are using 5G networks, the network operator may incorporate network slices and other 5G network benefits into the delivered services. Network operators wish to ensure the network, and the network slices, provide an appropriate Quality of Experience to subscribers.

It is, therefore, desirable to provide an improved method and system for network management.

The above information is presented as general background information only to assist, with an understanding of the present disclosure. No determination has been made, and no assertion is made, as to whether any of the above might be applicable as prior art with regard to the present disclosure.

SUMMARY

In a first aspect, a method for network management on a 5G network, the method including: building a subscriber persona associated with a subscriber on the network; predicting a traffic load on a network function based on the subscriber's persona; and allocating the subscriber to a network function based on the traffic load and the subscriber's persona.

In some cases, the network function may be a network slice or User Plane Function (UPF).

In some cases, the method may further include: monitoring the network function after the allocation; determining the subscriber's quality of experience when associated with the network function; and if the quality of experience is below a threshold, re-allocating the subscriber to a different network function.

In some cases, the subscriber persona may be determined based on a plurality of applications used by the subscriber on the network.

In some cases, the subscriber persona may be updated when the subscriber's network activity changes.

In some cases, the subscriber persona may be based on a function of how the subscriber is affected by loss, throughput and round trip time.

In some cases, the subscriber persona may be based on the service Mean Opinion Score (MOS) of the services used by the subscriber.

In some cases, the allocation of the subscriber to the network function may be based on the predicted load of the network function given the current load of the network function and the subscriber's persona.

In another aspect, there is provided a system for network management on a 5G network, the system including: a subscriber persona builder configured to build a subscriber persona associated with a subscriber on the network; an analysis module configured to predict a traffic load on a network function based on the subscriber's persona; and an allocation module configured to allocate the subscriber to a network function based on the traffic load and the subscriber's persona.

In some cases, the network function is a network slice or User Plane Function (UPF).

In some cases, the system may further include a monitoring module configured to: monitor the network function after the allocation; and determine the subscriber's quality of experience when associated with the network function.

In some cases, the subscriber persona builder may be configured to determine a plurality of applications used by the subscriber on the network.

In some cases, the subscriber persona builder may be configured to update the subscriber persona when the subscriber's network activity changes.

In some cases, the subscriber persona builder may be configured to build the subscriber persona as a function of how the subscriber is affected by loss, throughput and round trip time.

In some cases, the subscriber persona builder may be configured to build the subscriber persona based on the service Mean Opinion Score (MOS) of the services used by the subscriber.

In some cases, the allocation module may be configured to allocate the subscriber to the network function based on the predicted load of the network function given the current load of the network function and the subscriber's persona.

In yet another aspect, there is provided a method for network function selection on a 5G network, the method including: building one or more network subscriber personas based on applications used be each subscriber of a plurality of subscribers; selecting an appropriate network function based on the QoE of the various available network functions in delivering the applications of interest for the subscriber persona of the subscriber accessing the network function and allocating the network function based on the ability of the network functions Key Performance Indicators (KPIs) in delivering the best QoE for the application of interest for that subscriber persona.

In some cases, the network function may be a network slice or User Plane Function (UPF).

Other aspects and features of the present disclosure will become apparent to those ordinarily skilled in the art upon review of the following description of specific embodiments in conjunction with the accompanying figures.

BRIEF DESCRIPTION OF FIGURES

Embodiments of the present disclosure will now be described, by way of example only, with reference to the attached Figures.

FIG. 4 illustrates tables that may be used by the system to determine User Persona; and FIG. 5 is a sequence diagram for network slice section according to an embodiment.

DETAILED DESCRIPTION

Generally, the present disclosure provides a method and system for network management. Embodiments of the system and method are intended to define/build at least one persona for a subscriber. The subscriber persona may include information on the subscriber's user equipment and on the subscriber's usage patterns or the like. In some cases, a subscriber may have more than one subscriber persona, for example, based on time of day, or the like. Based on one or more subscriber personas, embodiments of the system and method detailed herein are intended to predict or determine a load for each relevant or related network slice instance or User Plane Function (UPF) within the network. For example, a subscriber may be allocated to each network slice or UPF based on the subscriber persona to determine the predicted load of the UPF or network slice.

Figure 1A:
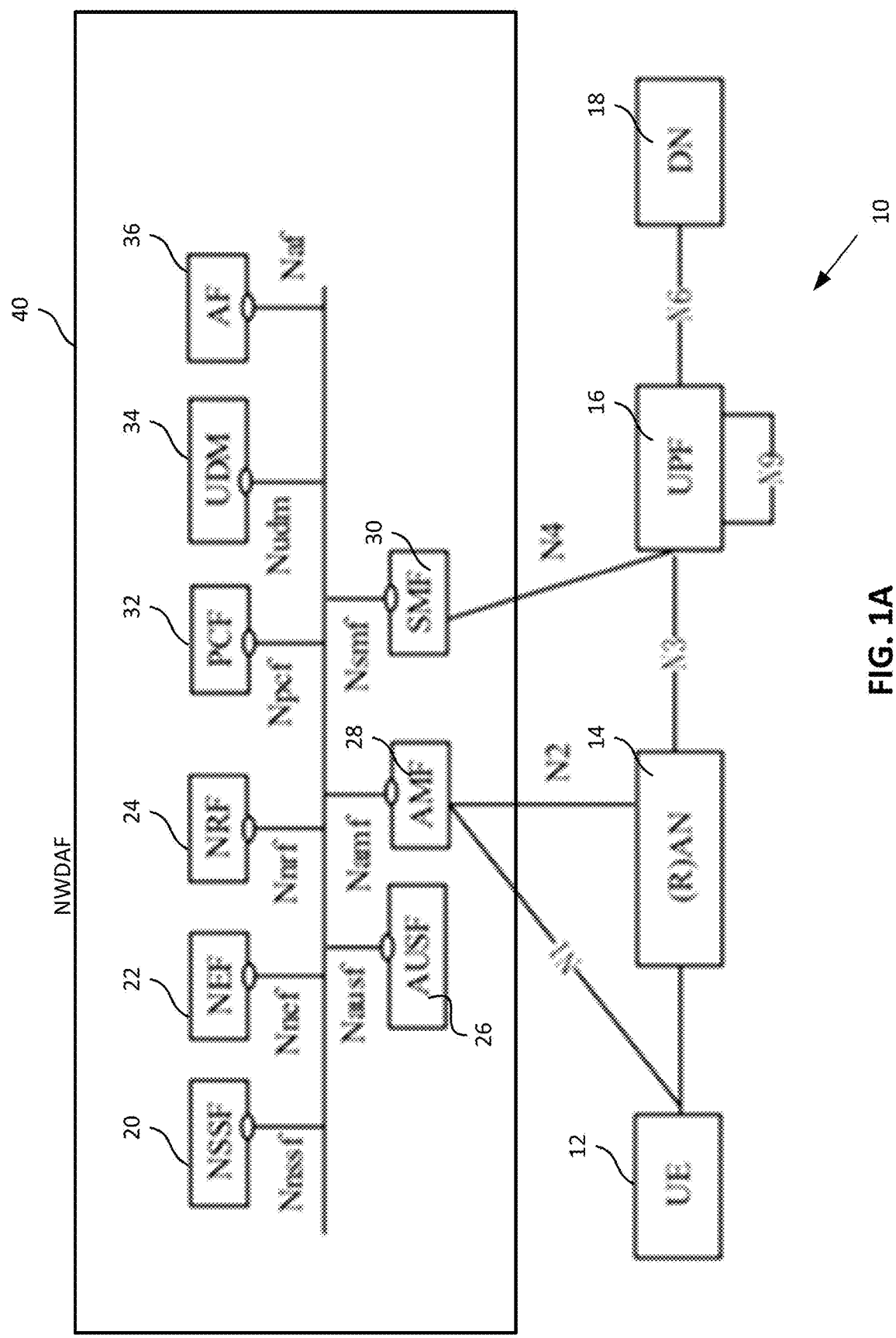
FIGS. 1A and 1B illustrate various architectures of a 5G computer network.
Figure 1B:
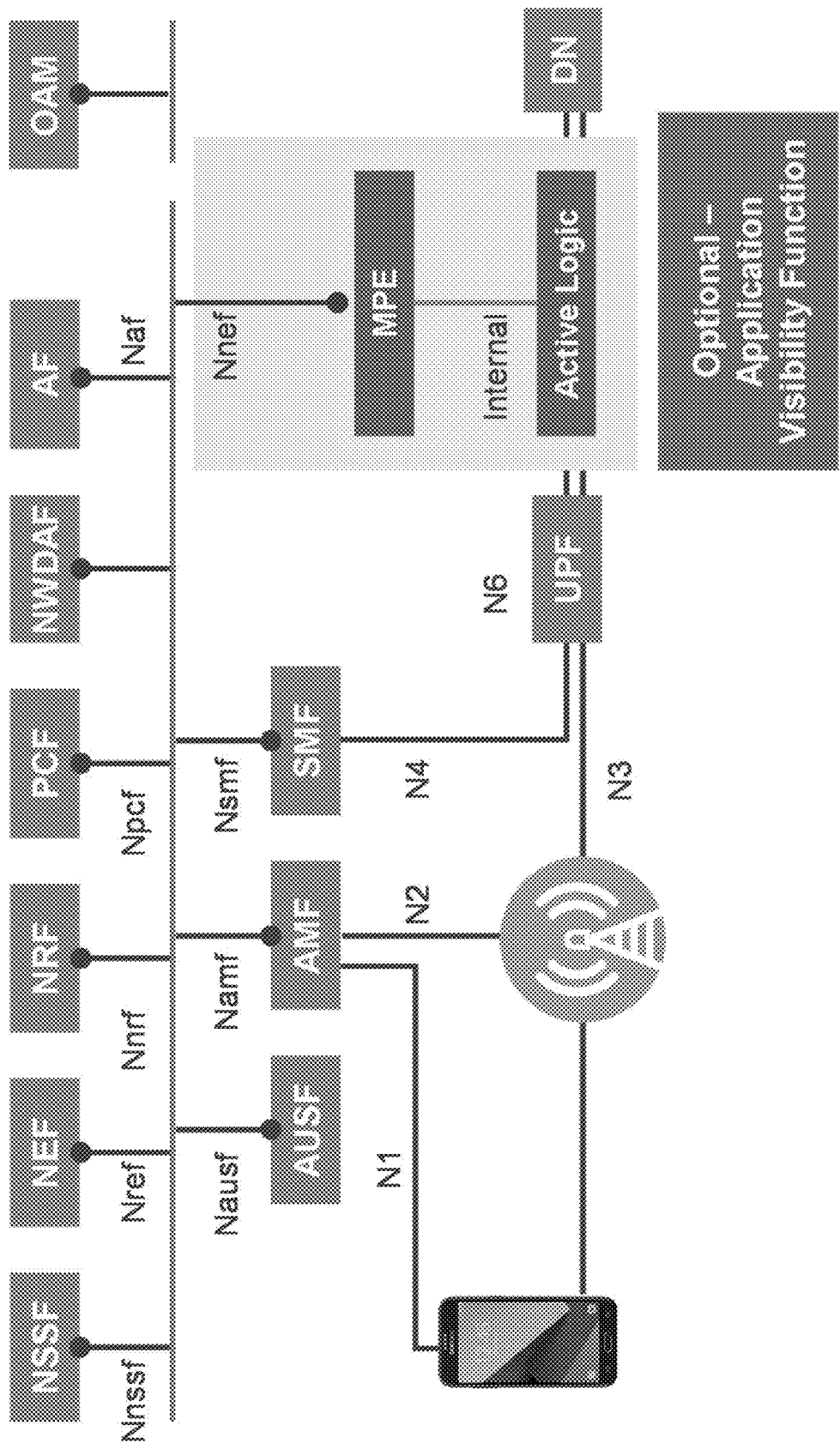

Computer networks, including 5G networks, generally aim to support a subscriber's desire to deliver a rich variety of high throughput (eMBB), highly reliable (URLLC), and low latency services. FIGS. 1A and 1B show example 5G Service Based Architectures of a computer network 10.

Subscribers, via user equipment 12, such as laptops, mobile phones, personal computers, often connect to a Radio Access Network (RAN) 14. The RAN is connected to a User Plane Function (UPF) 16 which then connects to the Data Network (DN) 18. It will be understood that a 5G network may further include at least one Network Slice Selection Function (NSSF) 20, a Network Exposure Function (NEF) 22, a Network Repository Function (NRF) 24, Authentication Server Function (AUSF) 26, Access and Mobility Management Function (AMF) 28, Sessions Management Function (SMF) 30, Policy and Control Function (PCF) 32, Unified Data Management (UDM) 34, and Application Function (AF) 36.

For application packets to be delivered through a 5G network between source and destination, three elements are typically involved, namely the UPF 16, the SMF, and the AMF. The UPF 16 facilitates user plane operations including packet routing and forwarding, interconnection to the Data Network, policy enforcement and data buffering. The SMF 30 is responsible for creating, updating and removing Protocol Data Unit (PDU) sessions and managing session context with the User Plane Function (UPF). The AMF 28 supports connection management, mobility management, access authentication and authorization, security context management, and the like. Other functions such as the NEF 22, UDM 34, and the like, enable various other functions to support the operation of the 5G network.

Conventional 5G Standalone networks introduced the concept of slicing or network slicing in order to optimize network resource utilization by slicing and scaling the network up and down to meet demand as well as optimizing resource assignment by assigning the appropriate resource to the appropriate slice based on the service SLAs and KPIs needed. With network slicing, operators may have options to reduce their operational expenditures associated with delivering their services by segmenting their network.

Many of the Network Functions (NFs) may feed data to a Network Data Analysis Function (NWDAF) 40, which is intended to provide analytics outcomes to other 5G network functions to permit effective allocation of network resources to best meet subscriber QoE. Various inputs into the NWDAF with subscriber information may be available from the various network functions (for example, the AMF and the like). The NWDAF processes the inputs and provides outcomes used by the NSSF, PCF, AMF, and SMF for various purposes such as slice allocation, 5GQI determination, and the like. For the inputs, while the NWDAF can query or otherwise retrieve data from various NFs and OAM, conventionally there is no information available in near-real-time on the applications used by subscribers. The NWDAF may collect network information (load, user statistics), and OAM data from every 5G element. Optionally, the NWDAF may receive or retrieves real-time application and QoE data from other components for more accurate outcomes.

Network Slicing is a mechanism for 5G networks that is intended to serve vertical industries with widely different service needs or Key Performance Indicators (KPIs), which may include latency, jitter, reliability, capacity and the like, as well as security, mobility, energy efficiency and the like. A Network Slice (NS) is a set of resources preconfigured to help meet KPIs to support the QoE or the like for an application flow or service. A Network Slice is intended to be a complete logical network partition including Radio Access Network (RAN) and Core Network (CN) that provides a plurality of network capabilities, which may vary from slice to slice. Distinct RAN and Core Network Slices can be available for 5G networks. A device, for example a UE 12, may access a plurality of Network Slices simultaneously through a single RAN.

Network slicing is intended to allow for a plurality of logical networks to be created on top of a common shared physical infrastructure. Network slicing allows networks to be logically separated, with each slice providing customized KPI based connectivity, while all slices continue to run on the same, shared physical infrastructure.

The UPF is configured to support features and capabilities to facilitate user plane operation. In particular, the UPF may aid in packet routing and forwarding, interconnection to the Data Network, and the like.

Subscriber to application mapping may be obtained by taking the subscriber ID and mapping the ID to the IP address of the PDU session for the subscriber. Subscriber ID can be SUPI or GPSI (Generic Public Subscription Identifier). A SUPI is a 5G globally unique Subscription Permanent Identifier (SUPI) allocated to each subscriber. The SUPI value is provisioned in USIM and UDM/UDR function in 5G Core. Application flows can then be associated with the subscriber ID by correlating the IP address in the data packets with the Subscriber ID currently owning that IP address as part of his PDU session.

By collecting Subscribers' Application Statistics from data-plane sources in the network (including but not limited to, for example, 5G UPF, Deep Packet Inspection, Application Detection Function, and the like), the system builds a subscriber persona profile per subscriber based on the subscriber's traffic mix over time, the system then is intended to provide for a subscriber persona to augment the information provided by the conventional inputs.

Having application awareness for the individual subscribers is intended to enhance the quality of outcomes of the NWDAF analytics. Instead of just determining a Network Slice Load based on basic KPIs such as CPU, memory, and traffic load into consideration when selecting the appropriate slice instance for a Protocol Data Unit (PDU) session that is being established, the system and method disclosed herein are intended to include additional KPIs such as subscriber application QoE for the slice instance selection. Subscriber persona may also be used to augment the service Mean Opinion Score (MOS) with a subscriber score. This is intended to lead to a more optimized resource utilization as it is intended to allow for the 5G network to automatically balance its resources to deliver the highest subscriber QoE, where the QoE might be related to subscriber application beyond simple KPIs such as CPU, memory, throughput, and the like of the slice instance. A similar method is also intended to be used when associating a UPF to the subscriber.

Conventionally, a network slice selection or a UPF selection would be made based on a best effort selection of a slice that is assumed to meet the service requirement based on anecdotal or empirical based configuration of resources which may or may not be capable of meeting the actual service. KPIs over time, and usage patterns.

Figure 2:
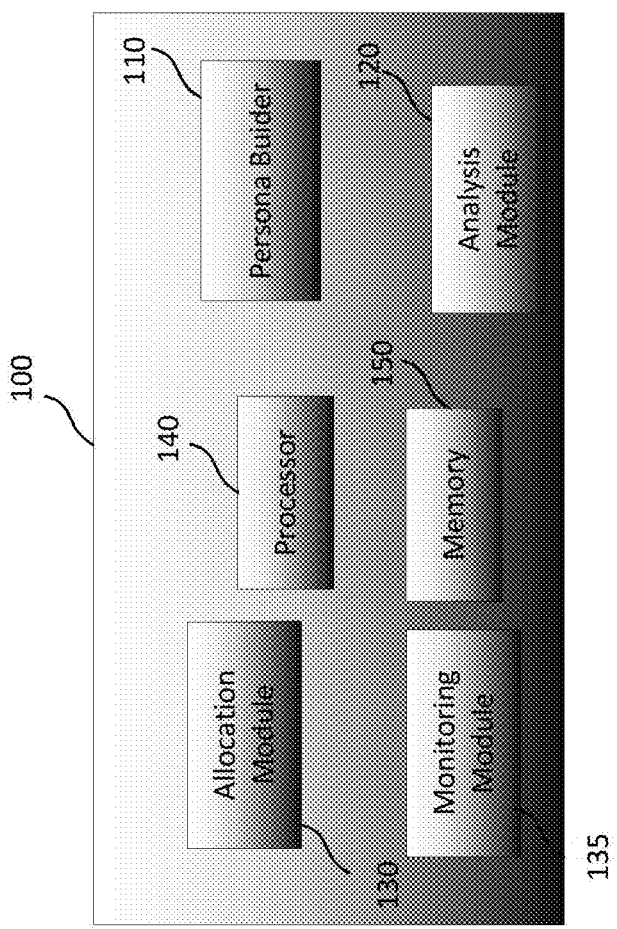
FIG. 2 illustrates a system for 5G network management according to an embodiment.

FIG. 2 illustrates an embodiment of a system 100 for network management according to an embodiment. The system includes a persona builder 110, an analysis module 120, an allocation module 130, a monitoring module 135, at least one processor 140 and at least one memory 150 component. The system is generally intended to reside on the core network but may be distributed throughout various network devices. For example, the modules, including the processor 140 and memory 150, are in communication with each other but may be distributed over various network devices or may be housed within a single network device. The system is intended to receive information from the computer network equipment that allows the system to determine traffic flow information, including application type. The system 100 is intended to be in contact with or operatively connected with the NWDAF. The processor 140 is configured to execute instructions stored in the at least one memory component in order to allow the modules to operate as detailed herein.

The persona builder 110 is intended to collect data with respect to user equipment accessing the network. The first time the UE joins the network, there will be no persona available. However, after persona data is collected over a period of time, for example, a few days, a week, a few weeks or the like, the persona can be defined based on the subscriber application consumption. The UE persona is built by examining, for example, the duration of length and/or volume of consumption and/or frequency of usage for applications during specific times of the day. In an example, during the weekend a certain subscriber may be a Gamer, while during the weekday evenings, the subscriber may be a Video user. Additional criteria may include if the user subscribes to specific application packages like high quality video packages, gaming packages, or the like, which may be used in the persona. These additional criteria may characterize the user into a specific profile. Additionally, all the above criteria can be calculated by examining the ratio of volume, time, and frequency of applications consumed relative to other subscribers.

In some cases, the persona builder 110 may determine the subscriber persona for each UE Subscription Permanent Identifier (SUPT) or Generic Public Subscription Identifier (GPSI) via, for example, deep packet inspect of traffic flows associated with the UE SUPI/GPSI. In some cases, this user persona data may be stored by the memory component in a table or other form. In some cases, the user persona may be, for example, Mobile gamer, Couch potato gamer, Mobile video user, Couch potato video user, Mobile talker (on the phone a lot), Couch potato talker, and the like, as shown in Table 1 below. Data collection may be done over a period of hours, days, weeks or even months to increase the accuracy of the subscriber persona prediction.

TABLE 1

| SUPI | Persona AM | Persona PM |
| --- | --- | --- |
| UE1 | Mobile Gamer | Couch Potato Video User |
| UE2 | Couch Potato Video User | Web User |
| UE3 | Mobile Talker | Mobile Gamer |

In some cases, where the period of time is, for example, 10 days, the user persona may be defined as a function of applications used over the last 10 days, duration of usage over the last 10 days, mobility patterns over the last 10 days, and the like. In some cases, User persona may vary depending on the day of the week and/or the time of the day and may change over a plurality of time periods.

Once a Persona has been built by the persona builder 110, the analysis module 120 may use the persona to predict a network slice load for an incoming subscriber, predict the slice load for subscribers already in the network slice, predict the service MOS for subscribers on the network slice and predict the confidence of the slice load estimate for subscribers already on the network slice, and the like. The analysis module 120 may perform various methods as detailed herein to provide for a better determination of network slice usage.

In a similar method, NWDAF assisted load balancing or rebalancing of network functions may also be reviewed by the analysis module after subscriber personas have been created. Once the persona is built based on the service Mean Opinion Score (MOS) of the services seen on the UPF network functions and subscribers most used services, a network function load calculation can be influenced. The analysis module 120 can find out the NF load of UPF/s based on the persona of the specific subscriber and cascade these details to the SMF for UPF selection during the PDU session establishment of a subscriber persona. In these cases, the SMF may select the UPF which provides better service experience based on the subscriber persona.

The allocation module 130 may receive or retrieve the network slice predictions or the UPF predictions from the analysis module 120 and may provide for different network slice allocation and UPF allocation if the QoE is not being met per subscriber. In other cases, the allocation module 130 may redistribute subscribers based on the user persona to best use the available network resources, including the network slice instances and/or UPF.

The monitoring module 135 is configured to continue monitoring the network traffic of the network slice instances and/or UPF. The monitoring module 135 may determine Network function load as well as may provide data used to predict the confidence of the network slice load or NF load of UPFs. In some cases, the monitoring module 135 may monitor the traffic flow of the UEs to determine whether a subscriber persona may need to be updated.

The analysis module 120 may be configured to predict the slice load for incoming subscribers. Conventionally the main output for slice load may be the sum or average of the network function (NF). In some cases, these computations may include Time Series prediction models or Machine Learning models and other models known in the art.

Figure 3:
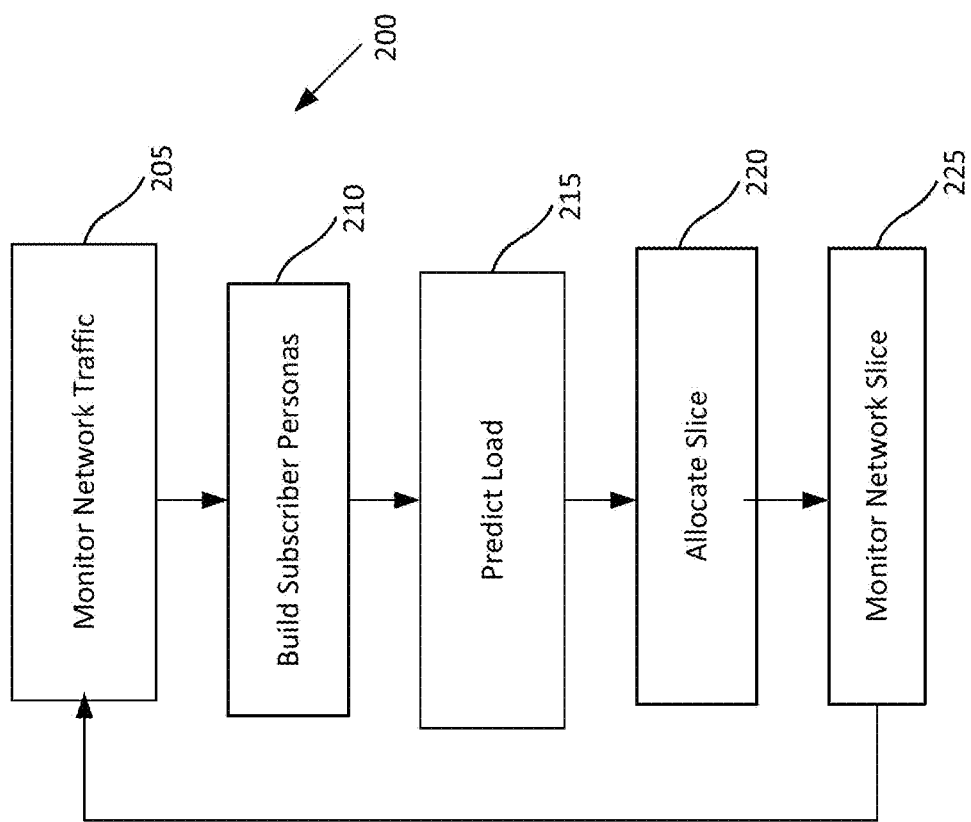
FIG. 3 illustrates a method for 5G network management according to an embodiment.

FIG. 3 illustrates a method 200 for network management according to an embodiment. The persona builder module is configured to receive or retrieve traffic session associated with at least one user equipment on a network, at 205. The persona builder module is configured to monitor the traffic flows for a predetermined period of time in order to categorize the UE as a subscriber persona, at 210.

The analysis module 120 is configured to predict a traffic flow load of at least one network slice instance or one UPF on a network, at 215, as described herein. The allocation module is configured to allocate subscribers to various network slice instances or UPFs based on the predicted load for the at least one network slice instance or UPF. The allocation module is configured to allocate subscribers based on their subscriber persona to a network slice instance or UPF that is intended to provide a desirable QoE to the subscriber based on the load of the at least one network slice, at 220.

At 225, the monitoring module continues to monitor the traffic flow of a network slice. If there is a change in subscriber distribution the system may determine various traffic actions to amend the distribution of subscribers. With the amended distributions, the system is intended to provide for better overall QoE to the subscribers of the network.

The system, and in particular the analysis module 120, is intended to include subscriber awareness into the network slice and UPF load determination. In particular, the analysis module 120 may determine the Function FN (NF load, scaled (0-100) Score of persona requesting, the slice) as defined below. It will be understood that the below example is related to network slice load but a similar method may be used with respect to UPF loads as detailed herein.

For incoming persona, the system may review one of the 3 tables below shown in FIG. 4 and add to Slice Load information determined from the type of persona.

In a particular example, a subscriber who has been determined to have a Talker persona is requesting the network slice load. The analysis module 120 may query a table for the weighting associated with the 'Talker' persona. This table will have scores for voice application with different weightings compared to those with other personas, for example, a Gamer, a Video watcher, or the like.

The analysis module 120 is configured to scale the Slice MOS (Score) from 0-5 to 0-100. The Score (MOS) for each subscriber persona that are on the slice=k1*Throughput+k2*Loss+k3*Round Trip Time (RTT). It will be understood that k1, k2, k3, are different for video persona, gamer persona, talker persona, and the like, as different personas will be differently affected by changes in Throughput, Loss, and RTT. As an example, a video persona may be more affected by a change to throughput over a change Round Trip Time.

If the analysis module 120 is determining a past analysis, it may apply a statistical analysis to estimate a score. If the analysis module 120 is determining a prediction, then apply time series prediction or Machine Learning (ML) models (such as a Long short-term memory (LSTM) or the like) within each of these tables, assuming that the scores are gathered in the past. That will indicate the Score for a sub with Video persona in the future, for example, for the next hour, next 3 hours, next 6 hours or the like. The choice of statistical analysis versus Machine Learning may depend on whether it is a time series analysis, the granularity of data available, the richness of various type of data available, the time taken to train models and the like. Some networks may have more variation than others and other networks may benefit from one or other type of analysis.

This determination by the analysis module 120 is intended to help the NSSF select the Network Slice Instance that provides the best QoE for the Traffic Type that the incoming Subscriber is expected to use the most, based on the persona of the subscriber.

Having a Network Slice instance configured to the subscriber's persona is intended to lead for a more optimized resource utilization since the 5G network can automatically balance the 5G Standard Alone network function resources such as SMF (Session Mobility Function) or AMF (Access Mobility Function), or UPF (User Plane Function), to deliver the highest QoE for the traffic type that will be consumed by the incoming subscriber. It is intended that the 5G SA may scale its resource allocation of network functions in response to increasing or decreasing traffic load. This automatic scaling allows the network to maximize user QoE while optimally utilizing all its resources.

The system may be configured to also predict Slice Load for subscribers already on the slice. In particular, each incoming slice instance, for example, a Slice Instance ID 15, the NSSF will request load for (Slice ID). Conventionally, this load was based on the sum of Network Function load.

With the system and method defined herein, the analysis module 120 is configured to output a function FN(NF load, scaled (0-100) Score of subscriber personas using the network slice instance). This allows for the data plane load on the slice to be included, as that is represented by the Score.

The analysis module 120 may select a network slice instance based on including the Slice QoE. The Slice Selection process considers the Subscriber Persona or each subscriber who is currently using the network slice instance. Thus, the system may additionally return a Score that is the Service MOS scaled from 0 to 100 for Slice Load. This is intended to be determined for all the network slice instances.

In an example, the analysis module 120 may determine the Network Slice Instance load that includes the Load as perceived by the user (subscriber) persona using that slice in addition to load metrics available from the NF. Given the Persona of the subscribers on that network slice instance, Score (MOS) may be determined by k1*Throughput+k2*Loss+k3*RTT, where k1, k2, k3 are different for video persona, gamer persona, talker persona, and the like Then, the analysis module 120 is configured to determine the weighted average of scores. Weights are intended to be associated with the number of users who are using that network slice instance.

In a particular example, a network slice instance may have 5 users with video persona, 3 users with gamer persona, 2 with Talker persona. Weighted average of Scores. 5(users)*3(score)+3(users)*4(score)+2(users)*5(score)=37/12=3.1. This result may then be scaled to [0 to 100].

The results may be provided to the consumer of the NWDAF namely the NSSF. The NSSF may then appropriately make the network slice instance selection.

The analysis module 120 is further configured to predict Service MOS for subscribers already on the slice. This is intended to provide slice QoE that considers the Subscriber Persona of the EUs on the slice. Conventionally the Service MOS was based on Network Function measurements as there was no subscriber awareness. The system is intended to provide subscriber awareness to these measurements in order to predict a more accurate QoE.

The system is configured to provide: Service MOS of subscriber personas using the slice. In a particular example, the system is configured to determine the Slice MOS that provides a MOS perceived by the user (subscriber) persona using that network slice instance. Given the Persona of the subscribers on that slice instance, Score (MOS) may be determined as usual—k1*Thput+k2*Loss+k3*RTT, where k1, k2, k3 are different for video persona, gamer persona, talker persona, and the like.

The analysis module 120 is configured to determine the weighted average of scores where the weights are the number of users of that persona who are using the network slice instance.

In a particular example, the network slice instance may have 5 users with video persona, 3 users with gamer persona, 2 with Talker persona and the weighted average of scores would be:

$$5(users)*3(score)+3(users)*4(score)+2(users)*5(score)=37/12=3.1.$$

In some cases, the Slice MOS may then be returned to the network operator or traffic actions may be applied if the score is below a predetermined threshold. In some cases, there may not be a need to scale the score to any particular scale. The outcome may be used by the consumer of the NF to take appropriate action. For example, if the consumer is the PCF, the PCF may decide to allocate a higher 5G Quality Indicator to the flow, so that over time the Service MOS will increase. This allows for the network to meet a certain Service Level Agreement (SLA) based on the feedback from the user experience.

The system may further be configured to predict a 'confidence' of the Slice Load estimate for subscribers already on the network slice instance. When a Slice Load estimate is requested of the system by, for example, a network operator, the NSSF will provide an estimate of the load for the requested period, for example, in the past, or in the future. In some cases, the confidence may be determined by the analysis module and may have input from the monitoring module. The confidence is intended to be determined based on the NF load and confidence based on the subscriber personas using the slice.

For a future prediction, the system may use Subscriber Personas to indicate the 'confidence' of the estimate for the requested time frame. It can be used to predict as far into the future as is requested by the consumer of the outcome. Time frames for future prediction depend on the use case being reviewed by the system. Typical time frames for future prediction would be minutes to hours. As the prediction duration increases, the accuracy of the outcomes is likely to decrease.

To do so, the system is configured to assume the 'constant' duration of an application session or of the individual user persona. Different applications have typical durations for which subscribers invoke them. For example, a long form video session would have a duration of an hour, whereas a voice call may have a typical duration of twenty minutes. These are configurable and depend on the user behavior. If per user persona, then the analysis module is configured to 'learn' how long each user spends for that particular application type. In some cases, this learning is intended to be completed by storing use patterns of particular applications used by the subscribers.

For each subscriber persona, the monitoring module is configured to keep track of how much time is remaining on the session. Different applications have typical durations for which subscribers invoke them. For example, a long form video session would have a duration of an hour, whereas a voice call may have a typical duration of twenty minutes. These are configurable and may depend on the user behavior. This monitoring may be done by comparing to the average time of that application session per persona. The time remaining on the flow may be used to determine the confidence level of the load of the network slice instance. The longer the time remaining on the session, higher is the confidence because it is expected that the user will be using this specific application for a certain period of time. In an example, a Video Persona user who is at the start his/her flow versus a Video Persona user who is at the end of his/her flow will result in different 'confidence' estimates.

In some cases, the confidence estimates may be a binary result, for example, high confidence or low confidence, to provide details with respect to the assumed accuracy of the results. In other cases, more complex or detail confidence estimates may be used.

FIG. 5 illustrates a network slice selection sequence diagram. An NSSF receives a request from the AMF for the Slice Instance Selection. The NSSF requests the NWDAF for the Slice Load Information (0 . . . 100). This is the overall slice load without providing information about the UE establishing the PDU session. With the addition of the system and method detailed herein the NSSF may additionally provide the UE information to the NWDAF. NWDAF takes the Subscriber Persona into consideration when returning the Slice Load that is based on the QoE that, the user will experience, based on his/her persona. The system and method disclosed herein are intended to provide for the user persona who is going to use the slice, the Slice Load that includes some characterization of Slice MOS (QoE)—for that persona. Thus, the Slice Selection process with the system and method detailed herein is intended to take into consideration the Subscriber Persona establishing that PDU session.

A sequence diagram would be similar to the diagram shown in FIG. 5. It would be understood that the SMF would send the request to the NWDAF for the UPF load information, instead of the NSSF requesting this information from the NWDAF. The UPF selection process would be similar to the network slice selection process with the characterization of the UPF MOS score would be similar to that of the Slice MOS.

Embodiments of the system and method detailed herein are also intended to provide for UPF selection. With the use of the NSSF, NF load can provide an indicator to the NSSF to allocate better UPFs, in that they are intended to be less loaded and provide for better MOS. In cases where Network slice is optional and not available in the network then UPF selection can become an important, factor. Based on the persona built based on the NF load, service mean opinion score of the services seen on the UPFs and subscribers most often used services, NWDAF can provide the details which assists the SMF for the UPF selection based on the subscriber persona to enhance service experience.

Once the persona is built based on the service Mean Opinion Score (MOS) of the services seen on the UPF network functions and subscribers most used services, the analysis module 120 can determine the NF load of UPF(s) based on the service MoS of the services and subscribers often used services and cascade these details to NSSF for the selection of UPFs within a particular slice. This selection method is intended to be similar to the network slice instance selection model detailed above. For a network that does not include network slices, it would be understood that the method may be used for the selection of an appropriate UPF.

Embodiments of the system and method detailed herein are intended to benefit network slices within, for example, a 5G RAN with a 5G Core. It is also intended to benefit 5G systems where there are no network slices by providing Service MOS outcomes and selecting appropriate UPFs.

Embodiments of the system and method described normalize the score to 0 to 100. It will be understood that other scales could be used to provide a score to be displayed or otherwise delivered to the network operator or the like.

The system is intended to provide outcomes and estimates that are more accurate than conventional estimates because the outcomes are customized to include subscriber behaviors/personas. The system is configured to add additional information to the conventional Network Function data, and in particular, subscriber and application awareness, in defining analytics outcomes. This additional data is intended to allow for more desirable slice instance allocation in order to provide the subscriber (or an average subscriber) with a higher QoE.

In the preceding description, for purposes of explanation, numerous details are set forth in order to provide a thorough understanding of the embodiments. However, it will be apparent to one skilled in the art that these specific details may not be required. It will also be understood that aspects of each embodiment may be used with other embodiments even if not specifically described therein. Further, some embodiments may include aspects that are not required for their operation but may be preferred in certain applications. In other instances, well-known structures may be shown in block diagram form in order not to obscure the understanding. For example, specific details are not provided as to whether the embodiments described herein are implemented as a software routine, hardware circuit, firmware, or a combination thereof.

Embodiments of the disclosure or elements thereof can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with other modules and elements, including circuitry or the like, to perform the described tasks.

The above-described embodiments are intended to be examples only. Alterations, modifications and variations can be effected to the particular embodiments by those of skill in the art without departing from the scope, which is defined solely by the claim appended hereto.

What is claimed is:

1. A method for network management on a 5G network, the method comprising:
   building a subscriber persona associated with a subscriber on the network, wherein the subscriber persona is based on a function of how the subscriber is affected by loss, throughput and round trip time;
   predicting a traffic load on one or more network functions based on the subscriber persona; and
   allocating the subscriber to a select network function of the one or more network functions based on the traffic load and the subscriber persona.

2. The method of claim 1 wherein the one or more network functions comprise a network slice or User Plane Function (UPF).

3. The method of claim 1 further comprising:
   monitoring the select network function after the allocation;
   determining a subscriber quality of experience based on a load of the select network function; and
   if the quality of experience is below a threshold, re-allocating the subscriber to a different network function.

4. The method of claim 1 wherein the subscriber persona is determined based on a plurality of applications used by the subscriber on the network.

5. The method of claim 1 wherein the subscriber persona is updated when the subscriber's network activity changes.

6. The method of claim 1 wherein the subscriber persona is based on the service Mean Opinion Score (MOS) of at least one service used by the subscriber.

7. The method of claim 1 wherein the allocation of the subscriber to the select network function is based on the predicted load of the one or more network functions given the current load of the one or more network functions and the subscriber persona.

8. A system for network management on a 5G network, the system comprising:
   a subscriber persona builder configured to build a subscriber persona associated with a subscriber on the network, wherein the subscriber persona is based on a function of how the subscriber is affected by loss, throughput and round trip time;
   an analysis module configured to predict a traffic load on one or more network functions based on the subscriber persona; and
   an allocation module configured to allocate the subscriber to a select network function of the one or more network functions based on the traffic load and the subscriber persona.

9. The system of claim 8 wherein the one or more network functions comprise a network slice or User Plane Function (UPF).

10. The system of claim 8 further comprising a monitoring module configured to:
    monitor the select network function after the allocation; and
    determine a subscriber quality of experience based on a load of the select network function.

11. The system of claim 8 wherein the subscriber persona builder is configured to determine a plurality of applications used by the subscriber on the network.

12. The system of claim 8 wherein the subscriber persona builder is configured to update the subscriber persona when the subscriber's network activity changes.

13. The system of claim 8 wherein the subscriber persona builder is configured to build the subscriber persona based on the service Mean Opinion Score (MOS) of at least one service used by the subscriber.

14. The system of claim 8 wherein the allocation module is configured to allocate the subscriber to the select network function is based on the predicted load of the one or more network functions given the current load of the one or more network functions and the subscriber persona.

* * * * *